(12) United States Patent
Weil et al.

(10) Patent No.: US 7,691,488 B2
(45) Date of Patent: Apr. 6, 2010

(54) DIFFUSION BARRIERS IN MODIFIED AIR BRAZES

(75) Inventors: Kenneth Scott Weil, Richland, WA (US); John S. Hardy, Richland, WA (US); Jin Yong Kim, Richland, WA (US); Jung-Pyung Choi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 11/811,633

(22) Filed: Jun. 11, 2007

(65) Prior Publication Data

US 2008/0305356 A1   Dec. 11, 2008

(51) Int. Cl.
*B32B 15/04* (2006.01)

(52) U.S. Cl. .................. 428/621; 428/633; 428/673; 228/124.5

(58) Field of Classification Search ............. 228/122.1, 228/248.1, 123.1, 124.1, 124.5, 124.6, 248.5, 228/262.1, 262.61; 420/469, 497, 501, 502
See application file for complete search history.

(56) References Cited

U.S. PATENT DOCUMENTS

| | | | | |
|---|---|---|---|---|
| 4,963,187 | A * | 10/1990 | Kondo et al. | 106/1.14 |
| 7,055,733 | B2 * | 6/2006 | Weil et al. | 228/122.1 |
| 2003/0132270 | A1 * | 7/2003 | Weil et al. | 228/122.1 |
| 2004/0060967 | A1 | 4/2004 | Yang et al. | |
| 2005/0092175 | A1 * | 5/2005 | Meacham | 95/45 |
| 2006/0239765 | A1 * | 10/2006 | Weil et al. | 403/50 |
| 2008/0217382 | A1 * | 9/2008 | Kim et al. | 228/177 |

FOREIGN PATENT DOCUMENTS

| WO | WO 2005/106999 | * 11/2005 |
|---|---|---|
| WO | WO2007001380 A2 | 1/2007 |
| WO | WO2008115696 A2 | 9/2008 |

OTHER PUBLICATIONS

PCT Written Opinion/International Search Report.
Weil, K. Scott, et al., The Effect of TiO2 on the Wetting Behavior of Silver-Copper Oxide Braze Filler Metals, Scripta Materilia, Elsevier, Amsterdam, NL, vol. 54, No. 1, Mar. 1, 2006.
Kim, Jin Yong, et al., Dual-Atmosphere Tolerance of Ag-CuO-Based Air Braze, International Journal of Hydrogen Energy, Elsevier Science Publishers B.V., Barking, GB, vol. 32, No. 16, Oct. 12, 2006.
Kim, Jin Yong, et al., Effects of Atmospheres on Bonding Characteristics of Silver and Alumina, International Journal of Hydrogen Energy, Elsevier Science Publishers G.V., Barking, GB, vol. 33, No. 14, Mar. 12, 2008.
Kim, Jin Yong, et al., Ag-Al Based Air Braze for High Temperature Electrochemical Devices, International Journal of Hydrogen Energy, Elsevier Science Publishers B.V., Barking, GB (vol. 32, No. 16, Oct. 12, 2006.

* cited by examiner

*Primary Examiner*—John J Zimmerman
(74) *Attorney, Agent, or Firm*—Douglas E. McKinley, Jr.

(57) ABSTRACT

A method for joining two ceramic parts, or a ceramic part and a metal part, and the joint formed thereby. The method provides two or more parts, a braze consisting of a mixture of copper oxide and silver, a diffusion barrier, and then heats the braze for a time and at a temperature sufficient to form the braze into a bond holding the two or more parts together. The diffusion barrier is an oxidizable metal that forms either a homogeneous component of the braze, a heterogeneous component of the braze, a separate layer bordering the braze, or combinations thereof. The oxidizable metal is selected from the group Al, Mg, Cr, Si, Ni, Co, Mn, Ti, Zr, Hf, Pt, Pd, Au, lanthanides, and combinations thereof.

17 Claims, 11 Drawing Sheets

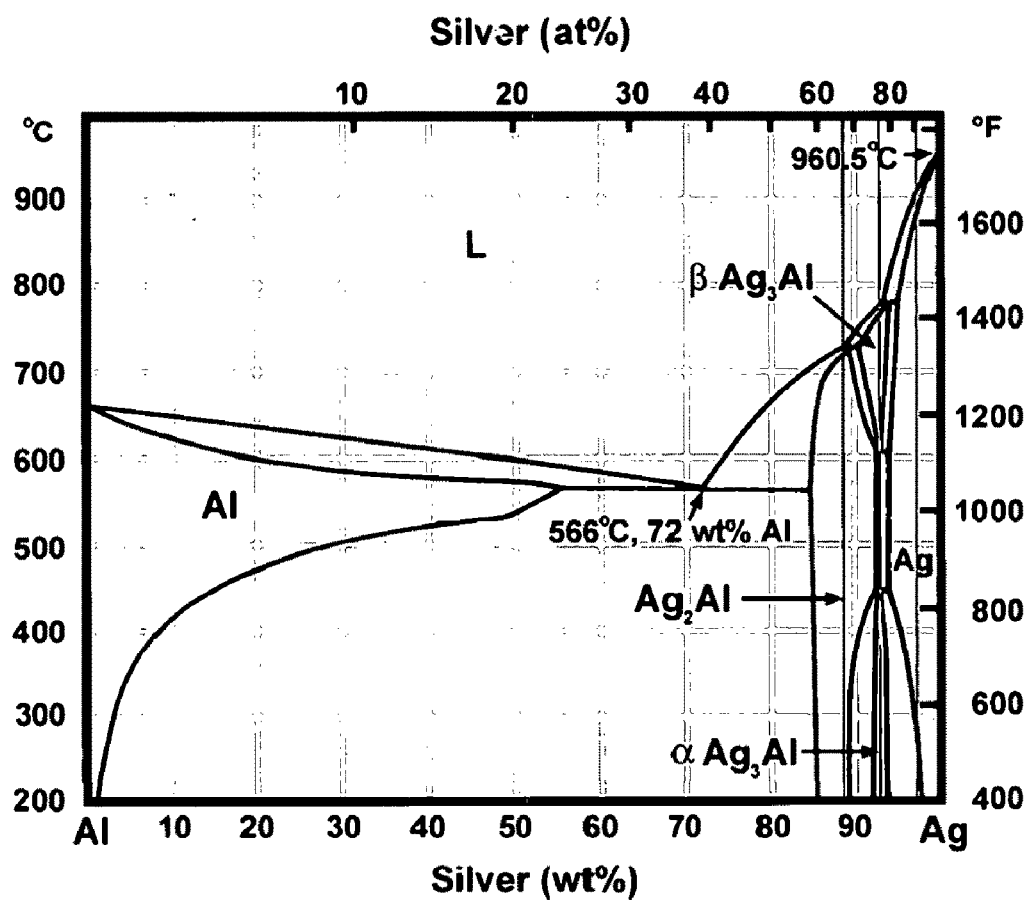
Fig. 1. Binary phase diagram of Al and Ag.

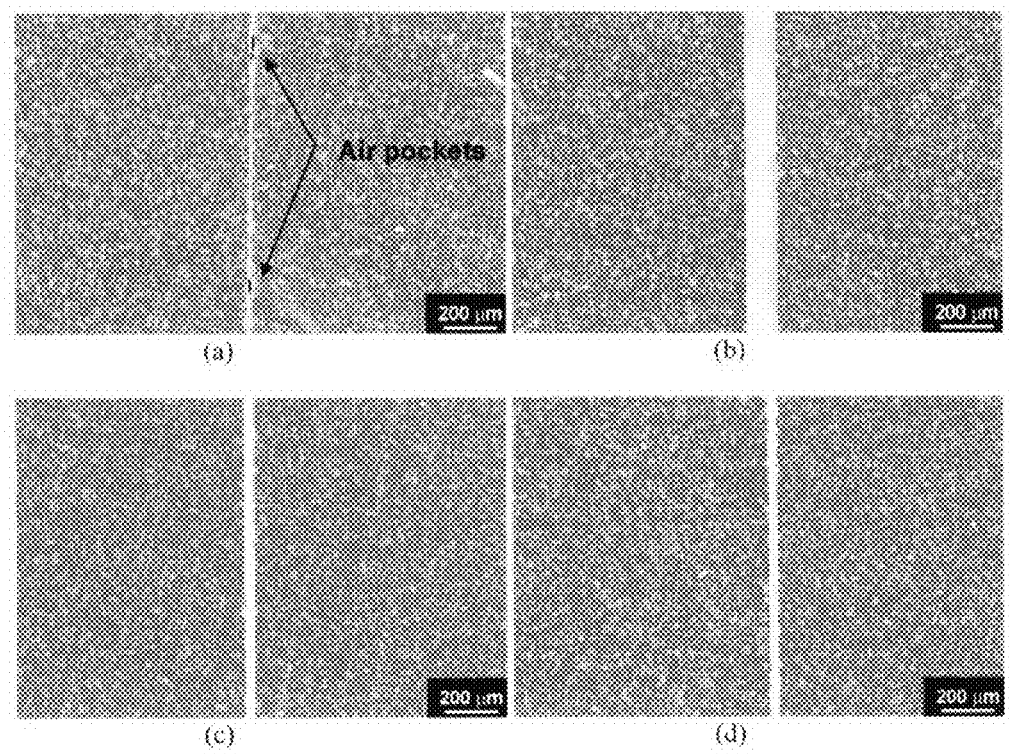
Fig. 2 Low magnification cross-sectional SEM micrographs (secondary electron images) of the alumina joints brazed at 1100°C: (a) Ag, (b) LG10, (c) LG25, and (d) LG33.

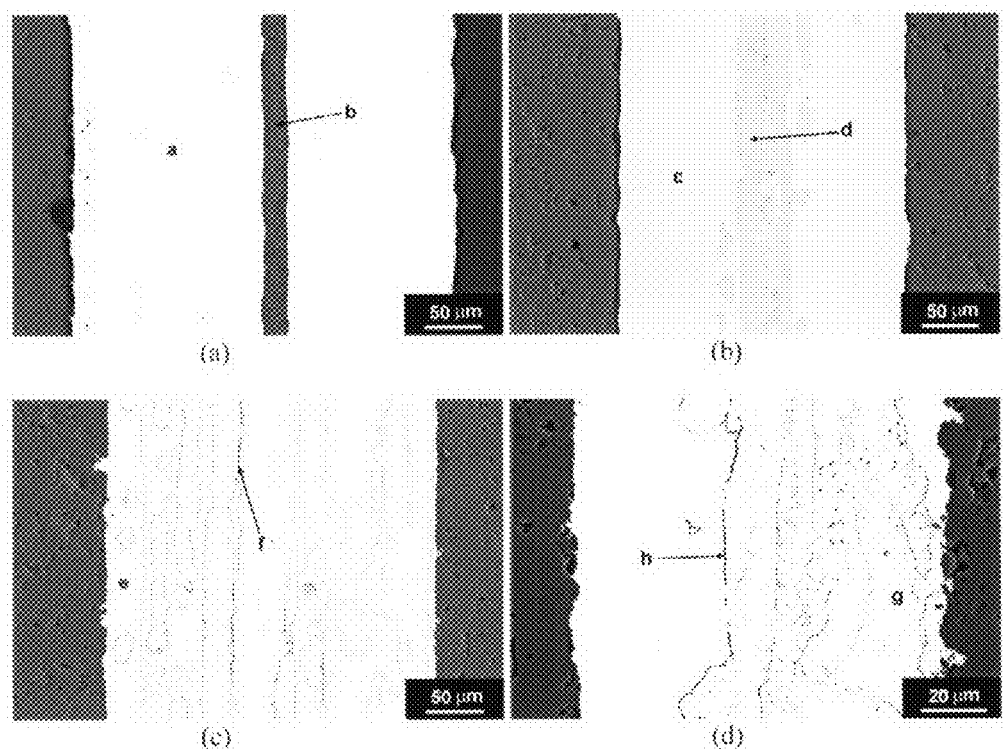
Fig. 3. Cross-sectional SEM micrographs (back-scattered images) of the alumina joints brazed with LG10 (9.8 at% Al): (a) 600°C, (b) 800°C, (c) 1000°C, and (d) 1100°C.

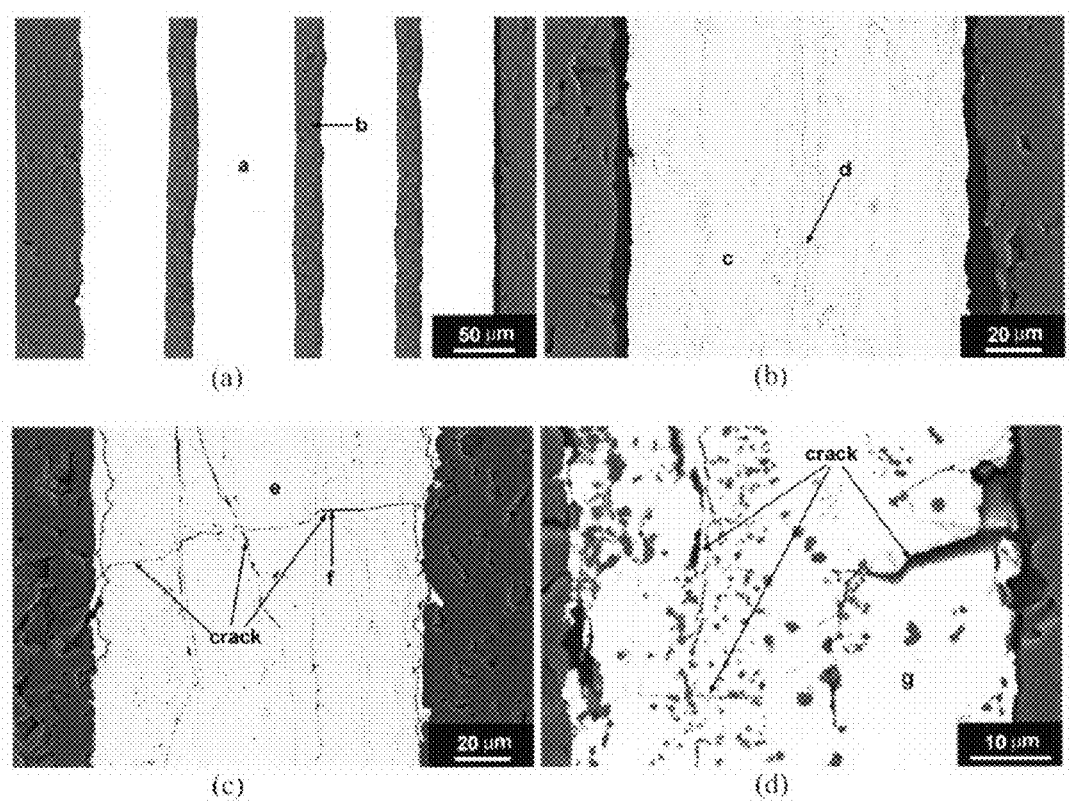
Fig. 4 Cross-sectional SEM micrographs (back-scattered images) of the alumina joints brazed with LG25 (26.5 at% Al): (a) 600°C, (b) 800°C, (c) 1000°C, and (d) 1100°C.

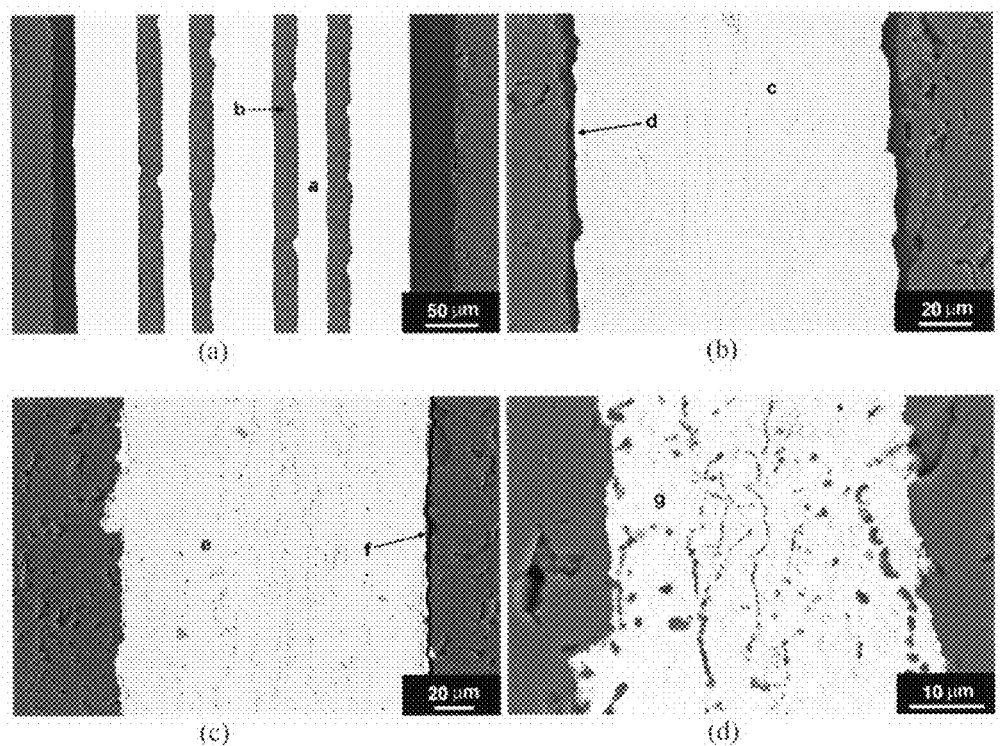
Fig. 5 Cross-sectional SEM micrographs (back-scattered images) of the alumina joints brazed with LG33 (35.1 at% Al): (a) 600°C, (b) 800°C, (c) 1000°C, and (d) 1100°C.

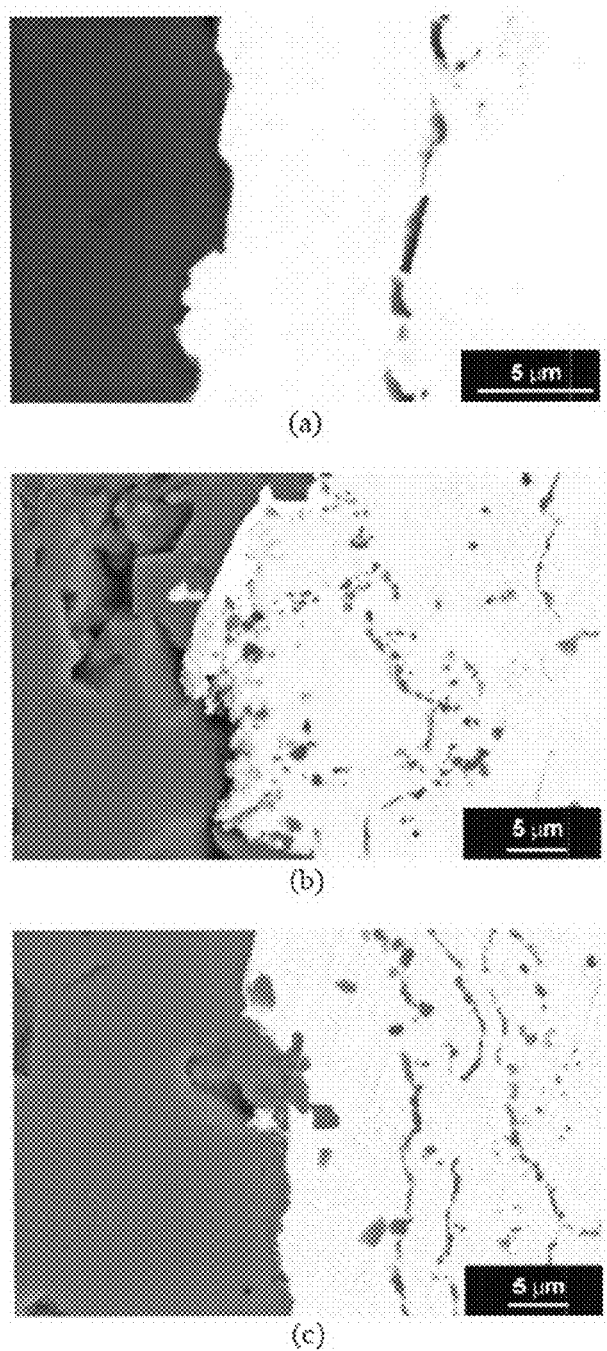
FIG. 6 Magnified SEM micrographs (back-scattered images) collected from the braze/substrate interface of the alumina joints brazed at 1100°C: (a) LG10 (9.8 at% Al), (b) LG25 (26.5 at% Al), and (c) LG33 (35.1 at% Al)

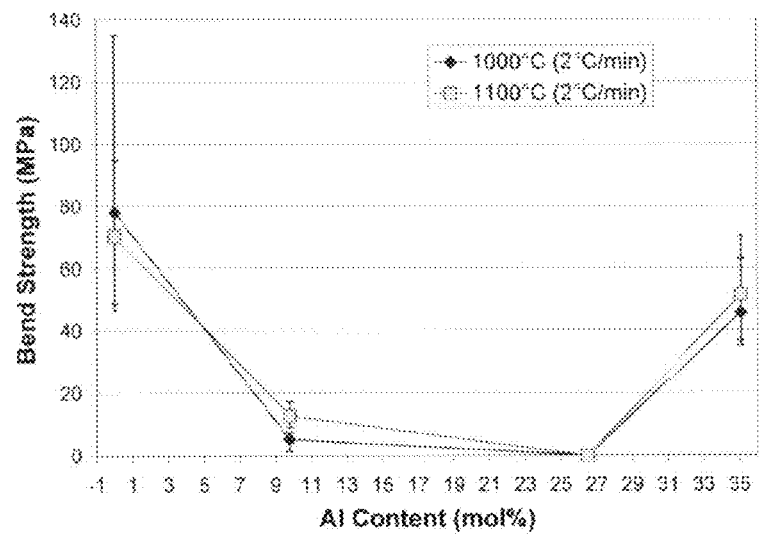
(a)
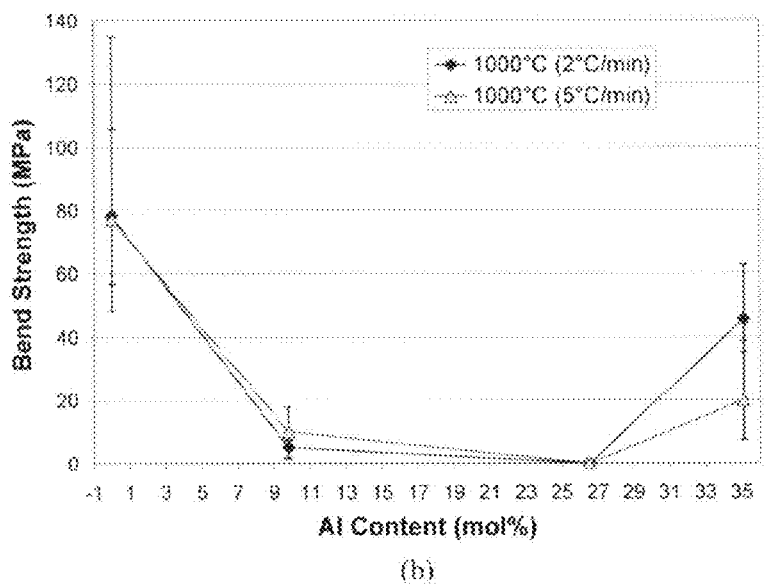
(b)
Fig. 7 Room temperature 4-point bend strength of alumina joints as a function of aluminum content: Effects of (a) Braze temperature and (b) heating rate

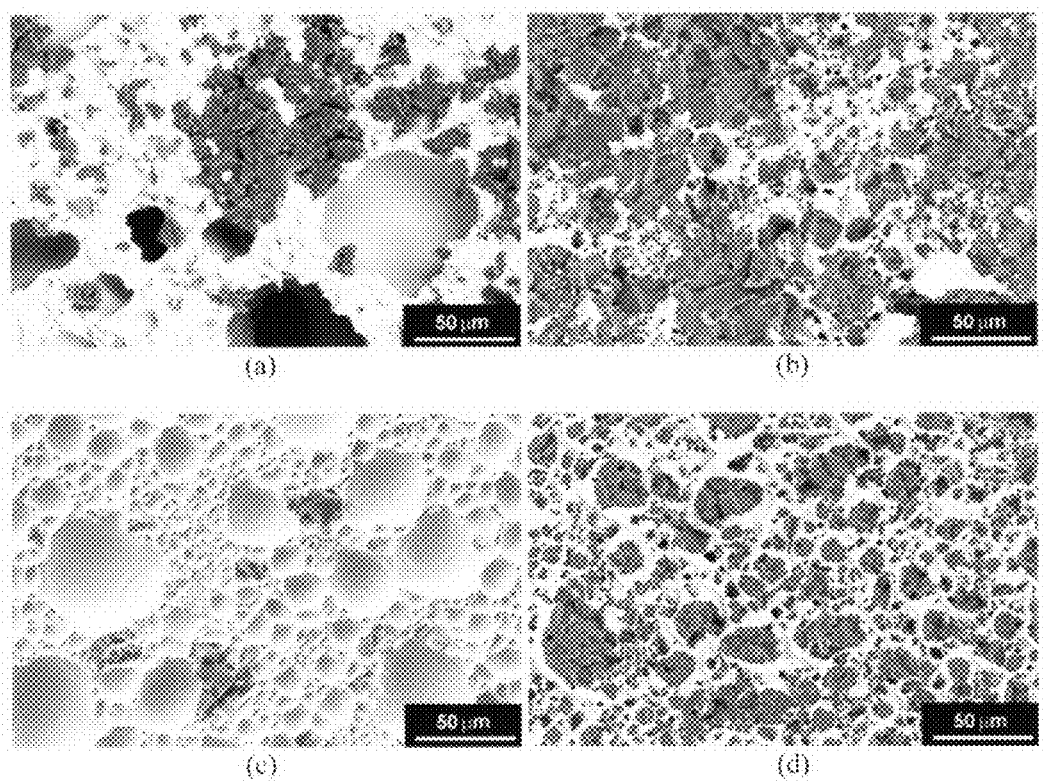
Fig. 8 Fracture surfaces (backscattered images) of the two corresponding halves of fractured alumina bars joined with pure silver: (a) and (b) bars joined at 1000°C, (c) and (d) bars joined at 1100°C

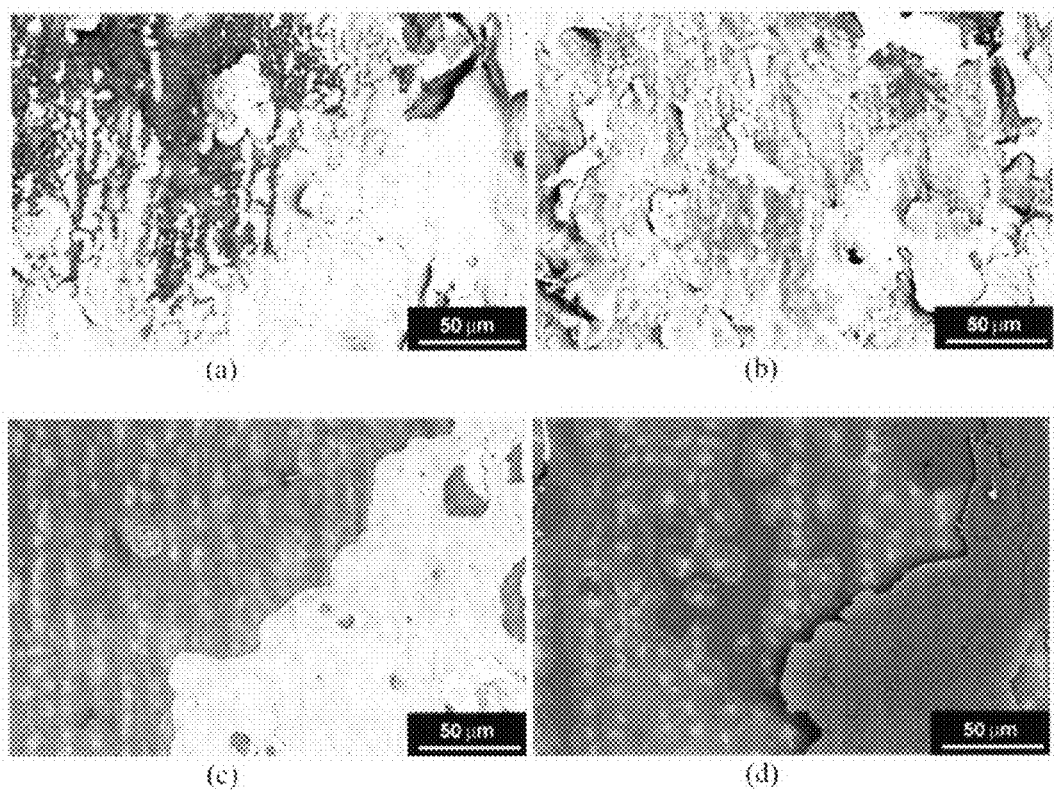
Fig. 9 Fracture surfaces (backscattered images) of the two corresponding halves of fractured alumina bars joined with LG10 (9.8 at% Al); (a) and (b) bars joined at 1000°C, (c) and (d) bars joined at 1100°C

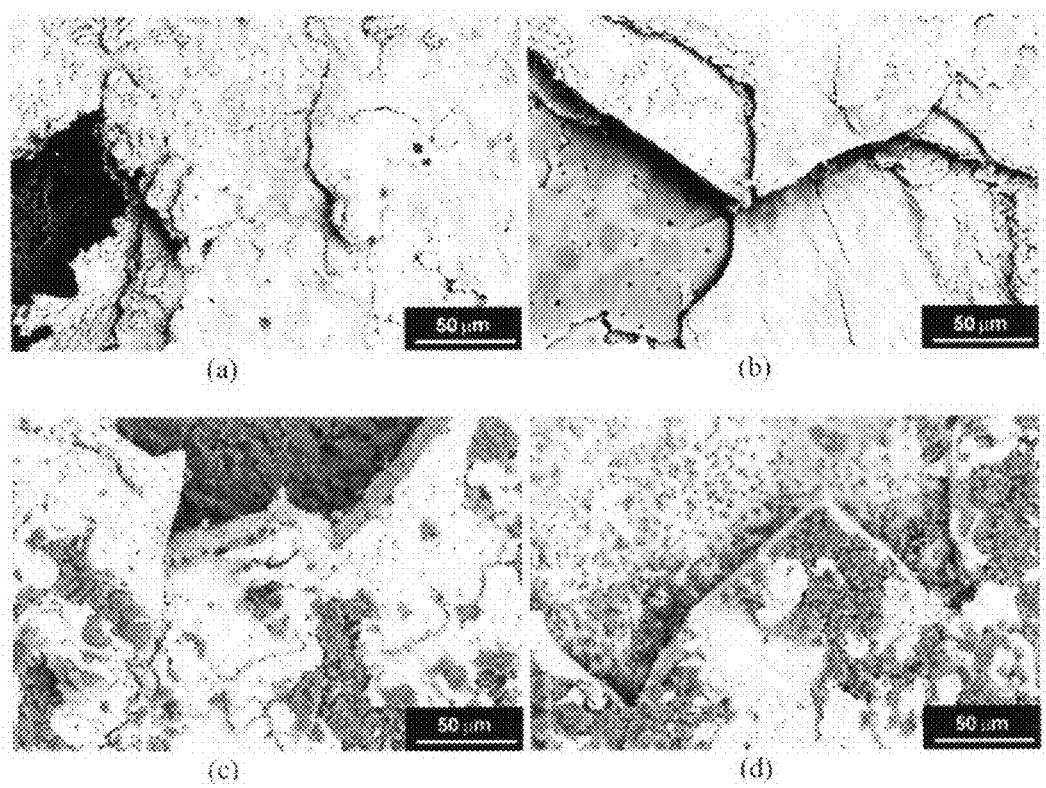
Fig. 10 Fracture surfaces (backscattered images) of the two corresponding halves of fractured alumina bars joined with LG25 (26.5 at% Al): (a) and (b) bars joined at 1000°C. (c) and (d) bars joined at 1100°C

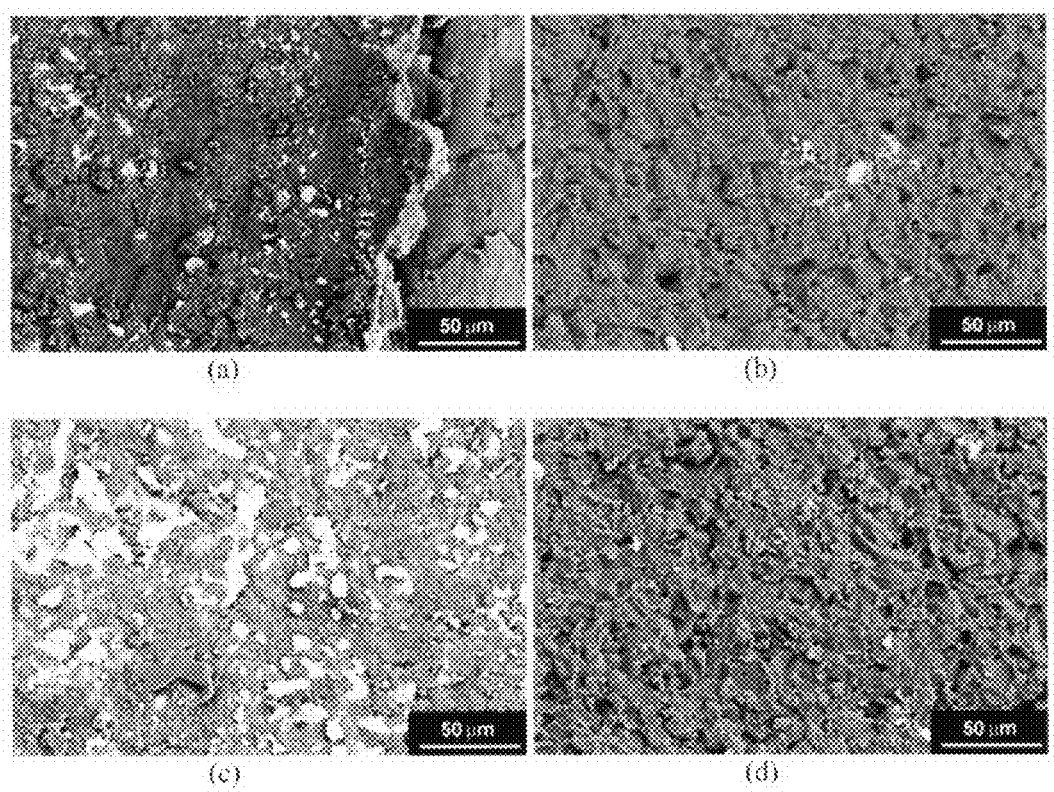
Fig. 11 Fracture surfaces (backscattered images) of the two corresponding halves of fractured alumina bars joined with LG33 (35.1 at% Al): (a) and (b) bars joined at 1000°C, (c) and (d) bars joined at 1100°C

DIFFUSION BARRIERS IN MODIFIED AIR BRAZES

GOVERNMENT RIGHTS STATEMENT

The invention was made with Government support under Contract DE-AC0676RLO 1830, awarded by the U.S. Department of Energy. The Government has certain rights in the invention.

TECHNICAL FIELD

This invention relates to methods for joining ceramic and oxidation resistant metal parts. More specifically, this invention relates to improved braze compositions for joining ceramic and oxidation resistant metal parts in an oxidizing atmosphere such as air.

BACKGROUND OF THE INVENTION

Joining ceramic and metal parts has proven to be one of the critical technical challenges facing the material scientists fabricating devices used in high temperature electrochemical applications. The ability to join a metal part to a ceramic part, or a ceramic part to another ceramic part, theoretically provides an economical way to manufacturing complex ceramic components from inexpensive, simple-shaped ceramic parts, and to provide a hermetic seal between components consisting of dissimilar materials. However, while a number of joining techniques, such as glass joining and active metal brazing are currently used, each possesses some form of trade-off or exhibits some penalty in terms of joint properties, ease of processing, and/or cost.

As an alternative, a simple and economical joining technique referred to as reactive air brazing (RAB) has been recently developed and demonstrated for joining several different substrates. As described in J. S. Hardy, J. Y. Kim, K. S. Weil, "Joining Mixed Conducting Oxides Using An Air-Fired Electrically Conductive Braze," *J. Electrochem. Soc.* Vol. 151, No. 8, pp. j43-j49 and U.S. patent application Ser. No. 10/334,346, now U.S. Pat. No. 7,055,733 RAB differs from conventional active metal brazing because RAB does not require the stringent atmosphere control normally associated with conventional active metal brazing. Instead, the RAB technique is conducted directly in air without the use of flux or reducing agents to promote wetting.

The braze filler materials of the RAB consist of two ingredients, a noble metal and an oxide compound. An oxide compound, which dissolves in a molten noble metal, is added to reactively modify the oxide faying surface and to help the remaining molten filler material wet on it. The resulting joint is adherent, ductile, and oxidation resistant. Due to the ductility and compliance of the noble metal, for example silver, this brazing can be used for high temperature electrochemical devices, even though there is a significant mismatch in the coefficient of thermal expansion (CTE) between silver (22.8 ppm/° C.) and typical ceramic components, such as yttria-stabilized zirconia (YSZ, 10.5 ppm/° C.)

One drawback of the RAB technique that has been identified in silver-copper oxide (Ag—CuO) based reactive air brazing systems for high temperature electrochemical applications relates to the propensity of silver to undergo a form of high-temperature embrittlement. This occurs due to the reaction of hydrogen diffused into the braze at one side and oxygen diffused into the braze at the other side when the silver-copper oxide braze is simultaneously exposed to a reducing atmosphere on one side and an oxidizing atmosphere on the other, as is typical in fuel cell applications. The present invention is a novel braze and method of forming a novel braze that addresses this problem, while preserving the advantages of silver-copper oxide (Ag—CuO) based reactive air brazing systems.

SUMMARY OF THE INVENTION

One object of this invention is to provide method for joining two parts, consisting of either two ceramic parts, or a ceramic part and a metal part. Generally, this objective is accomplished by providing two or more parts, providing a braze consisting of a mixture of copper oxide and silver, providing a diffusion barrier, and heating the braze for a time and at a temperature sufficient to form the braze into a bond holding the two or more parts together. Preferably, but not meant to be limiting, the copper oxide is between about 1 mol % and about 70 mol % of the silver.

Another object of this invention is to provide method for joining two parts that forms a barrier to the diffusion of hydrogen and oxygen through the joint, which may lead to weakening of the joint. As used herein, a "diffusion barrier" is thus any barrier that prevents the oxygen dissolved in the braze from reacting with hydrogen dissolved in the braze. For example, a "diffusion barrier" may consist of alloying elements within the braze, such as aluminum. These alloying elements may be provided as a homogeneous component of the braze. Alternatively, these alloying elements may be provided as a heterogeneous component of the braze, wherein the diffusion layer is mixed with the braze at the outer edges of the braze that are exposed to oxygen and hydrogen. Further, the alloying elements may be provided as a separate layer, placed adjacent to the braze, between the braze and the oxygen and hydrogen containing atmospheres. Also, the alloying elements may be combinations of heterogeneous, homogeneous, and separate layers. In all cases, these alloying elements have higher oxygen affinity than hydrogen, so that oxygen dissolved in the silver matrix preferentially reacts with these elements to form oxide rather than reacting with dissolved hydrogen.

The diffusion barrier can thus be provided as a homogeneous component of the braze, as a heterogeneous component of the braze, a separate layer bordering the braze, and combinations thereof. In each of these applications, it is preferred that the diffusion barrier be provided as an oxidizable metal. More preferred are oxidizable metals selected from the group Al, Mg, Cr, Si, Ni, Co, Mn, Ti, Zr, Hf, Pt, Pd, Au, lanthanides, and combinations thereof. In applications that include a diffusion layer consisting of a separate layer bordering the braze, in addition to oxidizable metals, the diffusion barrier may also be glasses, glass ceramics, and combinations thereof.

As used herein, an "oxidizable metal" is any metal that will react with gaseous oxygen, oxygen containing gasses, or water to form the oxide form of the metal. As an example, and not to be limiting, in embodiments of the present invention where and the braze is used to join SOFC applications to join two components, either ceramic to metal or ceramic to ceramic, and the oxidizable metal is formed as a homogeneous and/or heterogeneous component of the braze, the oxidizable metal will react with oxygen in the air at one side of the joint and/or with water vapor at the opposite side of the joint, thus forming an oxide form of the metal. This oxide form then prevents the oxygen and/or hydrogen from diffusing into the remainder of the joint. By preventing the oxygen and/or hydrogen from diffusing into the remainder of the joint, the present invention prevents the oxygen and hydrogen from forming water within the interior of the joint, which leads to pore formation and mechanical degradation.

While not meant to be limiting, the present invention may by used to join ceramics that act as insulators, and to join ceramics that act as electrical conductors. For example, mixed ionic electronic conducting oxides such as $La_xSr_{1-x}FeO_3$ have been shown to conduct electrons at high temperatures at about 800° C. The present invention may be used to electrically connect or join such mixed ionic electronic conducting oxides and operate in those environments.

The braze mixture may further comprise titanium oxide. Preferably, but not meant to be limiting, titanium oxide comprises between about 0.05 mol % and 5 mol % of the braze with respect to the silver. The braze mixture may further comprise Pt, Pd and combinations thereof. Preferably, but not meant to be limiting, the Pt, Pd and combinations thereof comprise between about 0.1 mol % and about 25 mol % with respect to the silver. The braze mixture may further comprise a ceramic particulate filler material. Preferably, but not meant to be limiting, the ceramic particulate may comprise between about 1% and about 50% of the total volume of the mixture of copper oxide, silver, and ceramic particulate. Also preferably, but not meant to be limiting, the ceramic particulate may be smaller than 200 μm, and provided as short fibers, long fibers, powders, flakes, and combinations thereof.

BRIEF DESCRIPTION OF THE DRAWINGS

The following detailed description of the embodiments of the invention will be more readily understood when taken in conjunction with the following drawing, wherein:

FIG. 1. is a binary phase diagram of Al and Ag.

FIG. 2 are low magnification cross-sectional secondary electron images (SEM micrographs) of the alumina joints brazed at 1100° C.: (a) Ag, (b) LG10, (c) LG25, and (d) LG33.

FIG. 3. are cross-sectional SEM micrographs (back-scattered images) of the alumina joints brazed with LG10 (9.8 at % Al): (a) 600° C., (b) 800° C., (c) 1000° C., and (d) 1100° C.

FIG. 4 are cross-sectional SEM micrographs (back-scattered images) of the alumina joints brazed with LG25 (26.5 at % Al): (a) 600° C., (b) 800° C., (c) 1000° C., and (d) 1100° C.

FIG. 5 are cross-sectional SEM micrographs (back-scattered images) of the alumina joints brazed with LG33 (35.1 at % Al): (a) 600° C., (b) 800° C., (c) 1000° C., and (d) 1100° C.

FIG. 6 are magnified SEM micrographs (back-scattered images) collected from the braze/substrate interface of the alumina joints brazed at 1100° C.: (a) LG10 (9.8 at % Al), (b) LG25(26.5 at % Al), and (c) LG33 (35.1 at % Al)

FIG. 7 are graphs showing the room temperature 4-point bend strength of alumina joints as a function of aluminum content showing the effects of (a) Braze temperature and (b) heating rate FIG. 8 are fracture surfaces (backscattered images) of the two corresponding halves of fractured alumina bars joined with pure silver: (a) and (b) bars joined at 1000° C., (c) and (d) bars joined at 1100° C.

FIG. 9 are fracture surfaces (backscattered images) of the two corresponding halves of fractured alumina bars joined with LG10 (9.8 at % Al): (a) and (b) bars joined at 1000° C., (c) and (d) bars joined at 1100° C.

FIG. 10 are fracture surfaces (backscattered images) of the two corresponding halves of fractured alumina bars joined with LG25 (26.5 at % Al): (a) and (b) bars joined at 1000° C., (c) and (d) bars joined at 1100° C.

FIG. 11 are fracture surfaces (backscattered images) of the two corresponding halves of fractured alumina bars joined with LG33 (35.1 at % Al): (a) and (b) bars joined at 1000° C., (c) and (d) bars joined at 1100°

DETAILED DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

A series of experiments were conducted to demonstrate the reduction of one embodiment of the present invention to practice. In these experiments, in-situ alloying and brazing was performed using foils of aluminum and silver. Three alloy compositions were selected based on the phase diagram shown in FIG. 1, which represent Ag (sample id # LG10), $Ag_3Al$ (sample id # LG25), and $Ag_2Al$ (sample id # LG33) phases. In each of these the compositions, the sample heated up to 800° C. revealed alloying of aluminum and silver and the alloying was mostly complete at 1000° C. Microstructure and mechanical properties of the joints largely depended on alloy compositions. In the case of the braze foil with LG10 (9.8 at % Al), a long continuous layer formed parallel to the direction of original aluminum foil. This indicates that aluminum was oxidized simultaneously while aluminum and silver diffused perpendicular to the direction of the foils. In the bend tests, the fracture occurred through the long alumina/braze filler interface, resulting in low bend strength (6~12 MPa). The joints brazed with LG25 (26.5 at % Al) showed cracks possibly due to the series of phase transformations and accompanying abrupt volumetric changes. The fracture initiated through these pre-existing cracks, leading to the extremely low values of joint strength observed in these specimens. The joints prepared using LG33 (35.1 at % Al) exhibited a good interface with some interfacial alumina particles and crack propagation through the interface between the alumina substrate and in-situ formed interfacial alumina particles or directly through these particles, resulting in the best bend strength among Al-added braze compositions.

Based on the binary Ag—Al phase diagram shown in FIG. 1, three basic Ag—Al braze compositions were developed with Al contents ranging from 10 to 33 at %, as shown in Table 1.

TABLE 1

| | | | | Heat-treament schedule employed | | |
|---|---|---|---|---|---|---|
| Sample ID | Target (Al at %) | # of Ag foils | # of Al foils | Foil configurations* | Al (at %) | Phase @ RT |
| LG10 | 10 | 10 | 1 | 5G/1L/5G | 9.8 | Ag |
| LG25 | 25 | 9 | 3 | 3G/1L/2G/1L/2G/1L/2G | 26.5 | $Ag_3Al$ |
| LG33 | 33 | 8 | 4 | 2G/1L/1G/1L/2G/1L/1G/1L/2G | 35.1 | $Ag_2Al$ |

*"G" and "L" represent silver and aluminum foils, respectively. Numbers indicate the number of 25 μm-thick foils stacking together Each composition represents one of the three major equilibrium phases over this range: aluminum alloyed silver, $Ag_2Al$, and $Ag_3Al$. Pure silver was used in this study as a reference baseline for mechanical property testing of the brazed joints. Since the inclusion of brittle intermetallic phases in the filler metals can make it difficult to produce brazing foils by melting and rolling, each filler metal composition was instead prepared by in-situ alloying during the brazing process. This was done by laying up, in alternating fashion, foils of silver (Alfa Aesar, 25 μm thick, 99.95%) and aluminum (Alfa Aesar, 25 μm thick, 99.45%) of the appropriate thickness and number to achieve the target composition listed in Table 1.

The area specific molar ratio of Ag to Al foils was calculated by averaging the weight out of five of each foil, all of which were cut into the same areal dimensions (3 cm×5 cm). The molar ratio of Ag to Al per unit area of the foils was 1.081. Based on this molar ratio, the total number of foils was selected to give similar initial filler metal thickness while maintaining the targeted Ag/Ag ratio as close as possible. In general the total number of Ag and Al foils was 11~12, which yielded a foil stack thickness of approximately 265~290 μm.

Each metal foil stack was cut into a circle measuring ~2 cm in diameter and inserted between two alumina discs (Alfa Aesar; 99.7% purity; 2 cm in diameter×3 mm high). A dead load of ~300 g was applied on the top disc to ensure good contact between the stack of foils and the alumina substrates during the brazing process. The assemblies were heated in air at 2° C./min to a final soak temperature (600, 800, 1000, and 1100° C.) and held for 6 min before furnace-cooling to room temperature. Microstructural analysis was performed on polished cross-sections of the brazed joints using a scanning electron microscope (SEM, JEOL JSM-5900LV), equipped with an Oxford energy dispersive X-ray spectrometer (EDS).

Room temperature 4-point bend testing was conducted to measure the mechanical strength of the as-brazed joints. Bend bars were prepared by joining the long edges of two rectangular alumina plates (Alfa Aesar; 98% dense; 99.7% purity; 100 mm long×25 mm wide×4 mm thick) to form a 100 mm×50 mm×4 mm plate. To keep both pieces of alumina in good contact with the braze filler during the joining process, a dead load of 400 g was applied to the top plate, resulting in an average pressure of ~10 kPa along the faying surfaces. Brazing was again conducted in air at a hold temperature of either 1000 or 1100° C. for 6 min. Samples were heated to the target temperature at a rate of 2° C./min and furnace-cooled to room temperature. To understand the effect of heating rate on the joint strength and microstructure of these brazed specimens, samples were also heated to 1000° C. at a rate of 5° C./min. Once joined, each plate was machined into 4 mm×3 mm×50 mm rectangular bars for flexural strength test. Four-point bend tests were carried out with spans between the inner and outer contact points of 20 and 40 mm respectively at a displacement rate of 0.5 mm/min. The bend (flexural) strength was calculated from the load at failure using the standard relationship derived for monolithic elastic materials:

bend (flexural) strength=$3P \cdot L/4b \cdot d^2$ where P is the applied load, L is the length of the outer span, and b and d are the respective width and height of the specimen.

Five specimens, each cut from the same plate, were used to determine the average room-temperature flexural strength for each joint. Scanning electron microscopy (SEM, JEOL JSM-5900LV) was employed to examine the fracture surfaces of the specimens as means of evaluating the potential mechanisms involved in their eventual failure.

Low magnification SEM micrographs were collected on cross sections of alumina discs joined at 1100° C. and are shown in FIGS. 2(a)-(d). Even though the thicknesses of the initial braze foil stacks were similar (11-12 foils of 265-290 μm total thickness), the thickness of the filler metal layer after brazing varied significantly and depending on the composition of phases formed during the brazing process. The pure silver resulted in a thin braze filler layer (~20 μm) containing visible air pockets as seen in FIG. 2(a). At 1100° C., molten silver was squeezed out from the dead loaded joint to form molten beads on the outer surfaces of alumina plates. Along with the formation of air pockets in the joint, this is evidence of both the low viscosity and insufficient wettability of pure silver on the alumina surface. Alternatively, joints prepared from the aluminum-modified braze fillers (shown in FIGS. 2(b) and 1(d) display no air pockets. The joint brazed with LG10 (9.8 at % Al) exhibits a thick braze filler layer (>120 μm) and no beading of the molten braze filler, even though the brazing temperature (1100° C.) was substantially higher than the alloy's liquidus temperature (which is less than 950° C. and lower than the melting temperature of pure silver). This finding suggests that this filler metal composition is resistant to squeeze out (i.e. it displays good compression resistance), possibly due to a compositional dependent increase in viscosity. Joints containing higher aluminum content shown in FIGS. 2(c) and 2(d) exhibited similar features (no air pockets and no beading), but thinner braze filler layers (50~60 μm) when compared to LG10. Since no beading on the alumina plates was found, the Al and Ag thinner braze filler layer can be attributed to the alloying of aluminum and silver, leading to the formation of intermetallic phases such as $Ag_{23}Al$.

The microstructure of joints prepared from the three aluminum modified filler metal compositions after being heated to 600, 800, 1000 and 1100° C. are shown in FIGS. 3-5. For LG10 (9.8 at % Al), no signs of significant alloying are observed when the joint heated to only 600° C. As shown in FIG. 3(a), the resulting cross-section essentially reveals the initial configuration the stacked foils: one aluminum foil (point "b") sandwiched between 10 silver foils (point "a" and the opposing side). The results from quantitative EDS analysis collected at each of the spots labeled in FIGS. 3(a)-(d) are listed in Table 2.

TABLE 2

Results of EDS quantitative analysis conducted on the spots marked in FIG. 3 (LG10, 9.8 at % Al).

| Element* | FIG. 3a (600° C.) | | FIG. 3b (800° C.) | | FIG. 3c (1000° C.) | | FIG. 3d (1100° C.) | |
|---|---|---|---|---|---|---|---|---|
| | "a" | "b" | "c" | "d" | "e" | "f" | "g" | "h" |
| O K | — | — | — | — | — | 17.43 | — | 38.36 |
| Al K | — | 100.00 | 1.06 | 19.20 | 8.73 | 35.45 | 7.16 | 46.26 |
| Ag L | 100.00 | — | 98.94 | 80.80 | 91.27 | 47.11 | 92.84 | 15.38 |

*All compositions listed are in at %.

The local chemistries measured at points "a" and "b" indicate that no measurable alloying takes place in the LG10 material at 600° C. However, the foils appear to be well bonded together despite this lack of chemical interaction. At 800° C., obvious alloying between the Al and Ag takes place, accompanied by shrinkage of the filler metal thickness as seen in FIG. 3(b). However alloying remains incomplete as indicated by the local chemistries measured at point "c" and "d", each of which respectively marks the initial sites for the silver and aluminum foils. In addition, there is no indication that extensive oxidation occurs (despite the fact that brazing was conducted in air) or that bonding takes place between the filler metal and the alumina substrate.

As shown in FIG. 3(c) and Table 2, the joint brazed at 1000° C. displays a more homogeneous distribution of aluminum within the filler metal, with distinct regions of alumina formed parallel to the original aluminum foil direction (e.g. point "f").

TABLE 3

Results of EDS quantitative analysis conducted on the spots marked in FIG. 4 (LG25, 26.5 at % Al).

| Element* | FIG. 4a (600° C.) | | FIG. 4b (800° C.) | | FIG. 4c (1000° C.) | | FIG. 4d (1100° C.) |
|---|---|---|---|---|---|---|---|
| | "a" | "b" | "c" | "d" | "e" | "f" | "g" |
| C K | — | — | — | — | — | 77.35 | — |
| O K | — | — | — | — | — | 5.82 | — |
| Al K | 2.50 | 99.77 | 24.64 | 2.82 | 23.82 | 8.43 | 21.59 |
| Ag L | 97.50 | 0.23 | 75.36 | 97.18 | 76.18 | 8.39 | 78.41 |

*All compositions listed are in at %.

EDS analysis conducted at point "e" near the braze/substrate interface reveals 8.73 at % Al, which is quite close to original target composition for this filler metal (9.8 at % Al)

Good bonding between the braze filler and the alumina substrate was observed as indicated by the penetration of molten braze into the rough surface of the alumina substrate. Even after brazing at the highest brazing temperature of 1100° C. (shown in FIG. 3(d)), the majority of the aluminum still remains in metallic form alloyed with the silver matrix (point "g": 7.16 at % Al) even though it is apparent that more extensive oxidation has occurred at this temperature (see point "h") than at the lower brazing temperatures.

The filler metal composed of 26.5 at % Al (LG25) exhibited a similar temperature dependent alloying process, as seen in the sequence of micrographs shown in FIGS. 4(a)-(d). No significant interaction between the Al and Ag foils occurs at 600° C., which displays the original foil stacking arrangement shown in FIG. 4(a).

TABLE 4

Results of EDS quantitative analysis conducted on the spots marked in FIG. 5 (LG33, 35.1 at % Al).

| Element* | FIG. 5a (600° C.) | | FIG. 5b (800° C.) | | FIG. 5c (1000° C.) | | FIG. 5d (1100° C.) |
|---|---|---|---|---|---|---|---|
| | "a" | "b" | "c" | "d" | "e" | "f" | "g" |
| O K | — | — | — | — | — | 48.18 | — |
| Al K | 1.91 | 99.61 | 32.33 | 1.66 | 30.92 | 44.52 | 30.23 |
| Ag L | 98.09 | 0.39 | 67.67 | 98.34 | 69.08 | 7.30 | 69.77 |

*All compositions listed are in at %.

Alloying is observed upon brazing at 800° C. as shown in FIG. 4(b). The more extensive alloying of this braze composition at 800° C., compared to LG10, is attributed to the lower liquidus temperature of this composition as well as the thinner silver foils employed in preparing this filler metal. However, the EDS results given in Table 3 indicate some inhomogeneity in the filler metal matrix. While the matrix represented by spot "c" contains 24.64 at % Al, which is close to the initial Al content in the braze foil stack, silver-rich particles are also found in the matrix (e.g. point "d", which displays only 2.82 at % Al). An acceptable interface between the braze filler and the substrate is observed, as shown in FIG. 4(c), when the joint is brazed at 1000° C. The matrix phase (point "e") exhibits improved homogeneity, although the silver-rich phase is still observed, predominantly at the braze/substrate interface.

A distinctive microstructural feature observed in this joint is the crack found between the filler metal and substrate indicated by point "f". Cracking due to embrittlement is possibly related to the complex series of phase transformations that this composition likely undergoes during cooling, as observed in the phase equilibrium diagram of FIG. 1 (i.e. liquid→Ag+liquid→Ag+β-Ag₃Al→Ag→Ag+α-Ag₃Al).

The joint brazed at 1100° C. shown in FIG. 4(d) also exhibits cracks, as well as extensive formation of alumina in particulate form. Despite this degree of oxidation, the majority of aluminum still remains in the metallic matrix phase shown at point "g" in FIG. 4(d): 21.59 at % Al.

FIG. 5 shows the microstructures of joints brazed using the LG33 filler metal (35.1 at % Al) at the four different soak temperatures. Similar to LG25, extensive alloying is observed in the entire braze filler layer at 800° C. as shown in FIG. 5(b), while no significant interaction between Ag and Al is detected at 600° C. as shown in FIG. 5(a). No significant oxidation of aluminum is observed in the specimen prepared at 800° C. The matrix phase (point "c") contains 32.33 at % Al (as indicated in Table 4), while a silver-rich phase observed along the filler metal/substrate interface displays only 1.66 at % Al. As shown in FIG. 5(c), the matrix phase (at point "e") formed at 1000+ C. still contains 30.92 at % Al even though some alumina formation is observed in the braze filler as well as along the braze/substrate interface. Poor bonding between the braze/substrate interface is observed on the right side of the joint, while the interface on the other side looks acceptable. Massive oxide formation on the de-bonded interface (at point "f") implies that poor contact between the braze filler and the substrate may cause oxidation of the braze filler surface before the braze melt wets the ceramic substrate, leading to reduced interfacial bonding. The joint brazed at 1100° C., shown in FIG. 5(d), still contains a majority of Al in the braze matrix (point "g" in Table 4) even though extensive oxide formation takes place in the bulk filler metal, as well as along the interface.

FIG. 6 shows magnified SEM micrographs collected on the filler metal/substrate interfaces of specimens brazed with each of the Al-modified filler metal compositions at 1100° C. All of the resulting filler metal compositions exhibit good interfacial bonding due to wetting of the molten braze filler on the substrate. Additionally the LG33 material (containing the highest aluminum content; 35.1 at % Al) displays interfacial oxide formation along the braze/substrate interface.

FIGS. 7(a) and (b) are graphs showing two plots of room temperature flexural strength as a function of aluminum content. FIG. 7(a) displays the effect of the final soak temperature on bend strength, while FIG. 7(b) shows the effect of heating rate. As seen in FIG. 7(a), there is no significant difference in bend strength between the joints brazed at 1000° C. and 1100° C. even though more extensive formation of alumina was observed at 1100° C. The bars joined with pure silver exhibit average bend strength of 71 MPa for the sample brazed at 1000° C. and 79 MPa for the sample brazed at 1100° C. However, the LG10 (9.8 at % Al) specimens display poor bend strength, 6 MPa after brazing at 1000° C. and 12 MPa at 1100° C. In the case of the LG25 (26.5 at % Al) specimens, the resulting joints were so weak that fracture often took place during sample preparation. The poor bend strength of the LG10 and LG25 joints was unexpected, particularly given that SEM examination revealed a decent filler metal/substrate interface in each. The bend bars brazed with LG33 (35.1 at % Al) exhibit bend strengths of 46 MPa (1000° C. soak temperature) and 52 MPa (1100° C. soak temperature), comparable with pure silver. FIG. 7(b) shows the effect of heating rate on the mechanical properties of joints. The higher heating rate of 5° C./min generally shows no improvement in bend strength compared to slower heating rate of 2° C./min, particularly at the low aluminum containing filler metal compositions. This result corresponds to the evidence found in the SEM and EDS analyses since most of the Al remains in metallic form in the silver matrix phase and there were no apparent differences observed between the filler metal/substrate interfaces in these specimens. Therefore rapid heating rate, which can reduce the formation of alumina, may not significantly improve the filler metal/substrate interface.

To better understand the mode of failure in these joints, SEM analysis was conducted on the fractured surfaces of the bend specimens. FIGS. 8-11 are back-scattered SEM images of comparative sets of fractured joining specimens that were brazed with different filler metal compositions at 1000° C. and 1100° C. FIGS. 8(a) and 8(b) are the two fractured halves of specimen brazed with pure silver at 1000° C., and display cup-cone marking dimples that are indicative of ductile fracture. In these samples, joint failure occurred within the bulk of the joint rather than at the interfaces or within the alumina substrates, which further suggests that good adhesion exists between the filler metal and the substrate.

The fracture surfaces of the pure silver specimen brazed at 1100° C. also exhibit similar signs of ductile as shown in FIGS. 8(c) and 8(d). The corresponding halves of the fractured LG10 specimen brazed at 1000° C. are shown in FIGS. 9(a) and 9(b). Unlike pure silver, these two surfaces display a thin alumina layer (dark phase) on a relatively smooth Ag—Al matrix surface (white). Since the morphology of the in-situ formed alumina is distinctively different from that of alumina substrate, the thin alumina observed is attributed to an in-situ layer formed in the filler metal, as shown in FIG. 3(c). The fracture surface of this specimen thus indicates that failure occurred through the in-situ alumina layer in the filler metal, and not along the braze/substrate interface. This is why this particular filler metal exhibits low bend strength despite forming a good interface with the alumina substrate.

In order to improve the strength of this filler metal, the in-situ alumina must form in a more localized manner as separate particles with sufficient soft matrix in between, rather than as well aligned brittle layers. This could be achieved by using a pre-alloyed braze foil, rather than an in-situ alloyed material. The bar brazed at 1100° C., shown in FIGS. 9(c) and 9(d), exhibits the same mechanism of fracture, although the alumina layers are more obviously apparent due to the greater extent of oxide formation in this higher temperature specimen.

The fractured surfaces of the LG25 bend bar specimens are shown in FIG. 10. Both of the bars joined at 1000° C. as shown in FIGS. 10(a) and 10(b), and 1100° C. as shown in FIGS. 10(c) and 10(d), display pre-fracture cracks, which were also observed in the corresponding cross-sectional micrographs shown in FIG. 4. The fracture initiated through these pre-existing cracks, leading to the extremely low values of joint strength observed in these specimens. As discussed previously, it is suspected that the existence of these flaws is due to the series of phase transformations (and accompanying abrupt volumetric changes) that occur in this material upon cooling form the molten state.

As shown in FIG. 11, the bend bar specimens prepared using LG33 (35.1 at % Al) exhibit a substantially different fracture surface. One of the surfaces in the bar brazed at 1000° C., shown in FIG. 11(a), displays filler metal covered with fine alumina particles measuring less than 5 μm in size. The corresponding half displays essentially a clean surface of the alumina substrate (grain size around 10 μm) with some smaller alumina particles. The smaller particles can be attributed to interfacial alumina that forms during the brazing process. Thus, crack propagation appears to take place through the interface between the alumina substrate and in-situ formed interfacial alumina particles or directly through these particles. Since fracture occurred at or near this interface and this joint displays a good interface as shown in FIG. 6(c), the best bend strength among Al-added braze compositions was achieved using this filler metal composition.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

We claim:

1. An improved joint between at least two parts, wherein the improvement comprises:
   a. a braze consisting essentially of a mixture of copper oxide and silver, and
   b. a diffusion barrier where the diffusion barrier is selected from the group consisting of a heterogeneous component of the braze, a separate layer bordering the braze, and combinations thereof.

2. The joint of claim 1 wherein the heterogeneous component of the braze is an oxidizable metal.

3. The joint of claim 2 wherein the oxidizable metal is selected from the group consisting of Al, Mg, Cr, Si, Ni, Co, Mn, Ti, Zr, Hf, Pt, Pd, Au, lanthanides, and combinations thereof.

4. The joint of claim 1 wherein the separate layer bordering the braze is an oxidizable metal.

5. The joint of claim 4 wherein the separate layer bordering the braze is selected from the group consisting of Al, Mg, Cr, Si, Ni, Co, Mn, Ti, Zr, Hf, Pt, Pd, Au, lanthanides, and combinations thereof.

6. The joint of claim 1 wherein the separate layer bordering the braze is selected from the group consisting of glasses, glass ceramics, and combinations thereof.

7. The joint of claim 1 wherein the mixture further contains titanium oxide.

8. The joint of claim 7 wherein the titanium oxide is between about 0.05 mol % and 5 mol % with respect to the silver.

9. The joint of claim 1 wherein the mixture further contains Pt, Pd and combinations thereof.

10. The joint of claim 9 wherein the Pt, Pd and combinations thereof comprise between about 0.1 mol % and about 25 mol % of the silver.

11. The joint of claim 1 wherein the braze consisting essentially of a mixture of copper oxide and silver further contains a ceramic particulate filler material.

12. The joint of claim 1 wherein the copper oxide is between about 1 mol % and about 70 mol % of the silver.

13. The joint of claim 11 wherein the ceramic particulate is between about 1% and about 50% of the total volume of the mixture of copper oxide, silver, and ceramic particulate.

14. The joint of claim 11 wherein the ceramic particulate is smaller than 200 µm.

15. The joint of claim 11 wherein the ceramic particulate is selected from the group consisting of short fibers, long fibers, powders, flakes, and combinations thereof.

16. The joint of claim 1 wherein the two or more parts are electrically conductive, and the braze consisting of a mixture of copper oxide and silver provides an electrically conductive path between the parts.

17. The joint of claim 1 wherein the mixture further contains titanium oxide, Pt, Pd, ceramic particulate filler material, and combinations thereof.

* * * * *

UNITED STATES PATENT AND TRADEMARK OFFICE
CERTIFICATE OF CORRECTION

| | | |
|---|---|---|
| PATENT NO. | : 7,691,488 B2 | Page 1 of 1 |
| APPLICATION NO. | : 11/811633 | |
| DATED | : April 6, 2010 | |
| INVENTOR(S) | : Kenneth Scott Weil et al. | |

It is certified that error appears in the above-identified patent and that said Letters Patent is hereby corrected as shown below:

col. 8, line 27: "1000+C" should be replaced with "1000°C"

col. 11, claim 10 should be replaced to read: The joint of claim 9 wherein the Pt, Pd and combinations thereof are between about 0.1 mol % and about 25 mol % of the silver.

col. 12, claim 16 should be replaced to read: The joint of claim 1 wherein the two or more parts are electrically conductive, and the braze consisting essentially of a mixture of copper oxide and silver provides an electrically conductive path between the parts.

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

PATENT NO.       : 7,691,488 B2                         Page 1 of 1
APPLICATION NO.  : 11/811633
DATED            : April 6, 2010
INVENTOR(S)      : Kenneth Scott Weil et al.

It is certified that error appears in the above-identified patent and that said Letters Patent is hereby corrected as shown below:

col. 8, line 27: "1000+C" should be replaced with "1000°C"

col. 11, lines 15-17, claim 10 should be replaced to read: The joint of claim 9 wherein the Pt, Pd and combinations thereof are between about 0.1 mol % and about 25 mol % of the silver.

col. 12, lines 11-14, claim 16 should be replaced to read: The joint of claim 1 wherein the two or more parts are electrically conductive, and the braze consisting essentially of a mixture of copper oxide and silver provides an electrically conductive path between the parts.

This certificate supersedes the Certificate of Correction issued March 15, 2011.

Signed and Sealed this
Twenty-sixth Day of April, 2011

David J. Kappos
*Director of the United States Patent and Trademark Office*